(12) United States Patent
Lee et al.

(10) Patent No.: US 8,673,104 B2
(45) Date of Patent: Mar. 18, 2014

(54) FABRICATING METHOD OF LIQUID CRYSTAL DISPLAY DEVICE

(75) Inventors: Hwi Deuk Lee, Gyeongbuk (KR); Dong Seok Park, Gyeongbuk (KR)

(73) Assignee: LG Display Co., Ltd., Seoul (KR)

( * ) Notice: Subject to any disclaimer, the term of this patent is extended or adjusted under 35 U.S.C. 154(b) by 146 days.

(21) Appl. No.: 13/339,195

(22) Filed: Dec. 28, 2011

(65) Prior Publication Data

US 2012/0261065 A1    Oct. 18, 2012

(30) Foreign Application Priority Data

Apr. 13, 2011 (KR) .................. 10-2011-0034466

(51) Int. Cl.
*B29C 65/00* (2006.01)
*B32B 37/00* (2006.01)
*B32B 38/04* (2006.01)

(52) U.S. Cl.
USPC ..... 156/265; 156/267; 156/273.3; 156/275.5; 156/281; 445/24

(58) Field of Classification Search
USPC ........ 156/256, 257, 268, 272.8, 273.3, 275.5, 156/281, 297, 299, 300; 445/24, 25
See application file for complete search history.

(56) References Cited

U.S. PATENT DOCUMENTS

| | | | | |
|---|---|---|---|---|
| 7,501,298 B2 * | 3/2009 | Ahn et al. | ........................ | 438/30 |
| 7,567,336 B2 * | 7/2009 | Jung et al. | ..................... | 349/190 |
| 8,323,066 B2 * | 12/2012 | Kim | ................................ | 445/25 |
| 2010/0216365 A1 * | 8/2010 | Song | ............................... | 445/25 |

FOREIGN PATENT DOCUMENTS

| | | | |
|---|---|---|---|
| JP | 10268802 | * | 10/1998 |
| JP | 2004126054 | * | 4/2004 |

* cited by examiner

*Primary Examiner* — Linda L. Gray
(74) *Attorney, Agent, or Firm* — Birch, Stewart, Kolasch & Birch, LLP

(57) ABSTRACT

A method of fabricating an LCD device is discussed. The method according to an embodiment includes combining a first substrate having thin film transistors with a second substrate having black matrices and color filters using a sealant. Also, the method includes: forming an absorbent layer which is positioned to overlap with an edge of the sealant and burned by a laser; curing the sealant partially covered with the absorbent layer by irradiating UV light; burning the absorbent layer using a laser beam; and cutting the sealant through the burnt absorbent layer and the second substrate opposite to the absorbent layer using a scriber.

12 Claims, 3 Drawing Sheets

FABRICATING METHOD OF LIQUID CRYSTAL DISPLAY DEVICE

CROSS-REFERENCE TO RELATED APPLICATION

This application claims priority under 35 U.S.C. 119 to Korean Patent Application No. 10-2011-0034466, filed on Apr. 13, 2011, which is hereby incorporated by reference in its entirety.

BACKGROUND

1. Field of the Disclosure

This disclosure relates to a liquid crystal display (LCD) device, and more particularly to an LCD device fabricating method capable of enhancing the reliability of the LCD device and realizing a narrow bezel panel by reducing the size of a bezel.

2. Description of the Related Art

In general, the LCD device applies data signals, corresponding to image information, to liquid crystal cells arranged in an active matrix shape and controls the transmittance of the liquid crystal cells so that the desired image is displayed. To this end, the LCD device includes an LCD panel configured to display images and a drive circuitry configured to apply driving signals to the LCD panel.

The LCD panel includes first and second glass substrates combined with each other with a fixed space therebetween and a liquid crystal layer with an anisotropic dielectric constant interposed between the first and second glass substrates. Such an LCD panel displays a desired image by controlling the quantity of transmitting light through the adjustment of an electrical field which is applied to the liquid crystal layer with the anisotropic dielectric constant.

The first glass substrate (a thin film transistor array substrate) includes a plurality of gate lines, a plurality of data lines, a plurality of pixel electrodes, and a plurality of thin film transistors. The gate lines are arranged in a direction on the first glass substrate in such a manner as to be separate by a fixed interval from one another. The data lines are arranged in another direction perpendicular to the arranged direction of the gate lines in such a manner as to be separate by a fixed interval from one another. The pixel electrodes are formed in pixel regions which are defined by the gate and data lines crossing each other, respectively. The thin film transistors are switched by signals on the respective gate lines and transfer signals on the respective data lines to the respective pixel electrodes.

The second glass substrate (a color filter substrate) includes a black matrix layer, red, green and blue color filter layers, and a common electrode. The black matrix layer is used to shield light in the rest portion of the second glass substrate without the pixel regions. The red, green and blue color filter layers are used to realize a variety of colors. The common electrode is used for realizing an image.

The first and second glass substrates are combined with each other by a sealant in such a manner as to have a fixed space provided by spacers therebetween. Then, the liquid crystal layer is formed between the first and second substrates.

As such, the LCD device sequentially applies a turning-on signal to the gate lines, and supplies data signals to the data lines whenever the turning-on signal is applied, thereby displaying a desired image on the LCD panel.

The LCD panel is prepared by combining first and second glass substrates spaced from each other with a fixed distance using a sealant and forming the liquid crystal layer between the two substrates. The first glass substrate has a margin area. As such, the first glass substrate has a wider area than that of the second glass substrate. A gate pad portion connected to the gate lines and a data pad portion connected to the data lines are formed in the margin area of the first glass substrate that is not overlapping with the second glass substrate.

In order to maintain a cell gap between the combined first and second glass substrates, the sealant is hardened using ultraviolet (UV) light. Then, the combined glass substrates are cut and processed in units of LCD panel.

Meanwhile, in order to minimize a bezel area, a scribe-on-seal method is proposed which irradiates a laser beam on the sealant and cuts the combined substrates. In other words, the scribe-on-seal method performs a burning process by focusing a laser beam on the sealant before the cutting process.

However, the range of wavelengths being absorbed by the sealant is limited. As such, it is necessary to provide a high-energy laser beam to the burning process.

More specifically, the sealant is formed from transparent acrylic and epoxy based materials, and hardened into a light gray solid through the irradiation of UV light. If the burning process using a laser beam is performed for the hardened sealant with the light gray color, the laser beam must have a high energy (or a high power). This results from the fact that the wavelength range being absorbed into the light gray sealant is limited.

If the burning process using the high energy laser beam is performed before the process of cutting the second glass substrate, the circumference of a cutting plane can be damaged due to heat being generated by the high energy laser beam. Also, the sealant can also be damaged. Due to this, reliability of the LCD device can deteriorate.

BRIEF SUMMARY

Accordingly, the present embodiment is directed to a fabricating method of the LCD device that substantially obviates one or more of problems due to the limitations and disadvantages of the related art.

An object of the present embodiments is to provide a fabricating method of the LCD device that is adapted to implement a narrow bezel panel and enhance reliability of the LCD device by forming a resin or pigment pattern on a part of a sealant, combining lower and upper substrates, and performing a burning process for the resin or pigment pattern on the sealant using a laser beam before a scribing process.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

An LCD device fabrication method according to one general aspect of the present disclosure includes combining a first substrate having thin film transistors with a second substrate having black matrices and color filters using a sealant. Also, the LCD device fabrication method includes: forming an absorbent layer which is positioned to overlap with an edge of the sealant and burned by a laser; curing the sealant partially covered with the absorbent layer by irradiating UV light; burning the absorbent layer using a laser beam; and cutting the sealant through the burnt absorbent layer and the second substrate opposite to the absorbent layer using a scriber.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
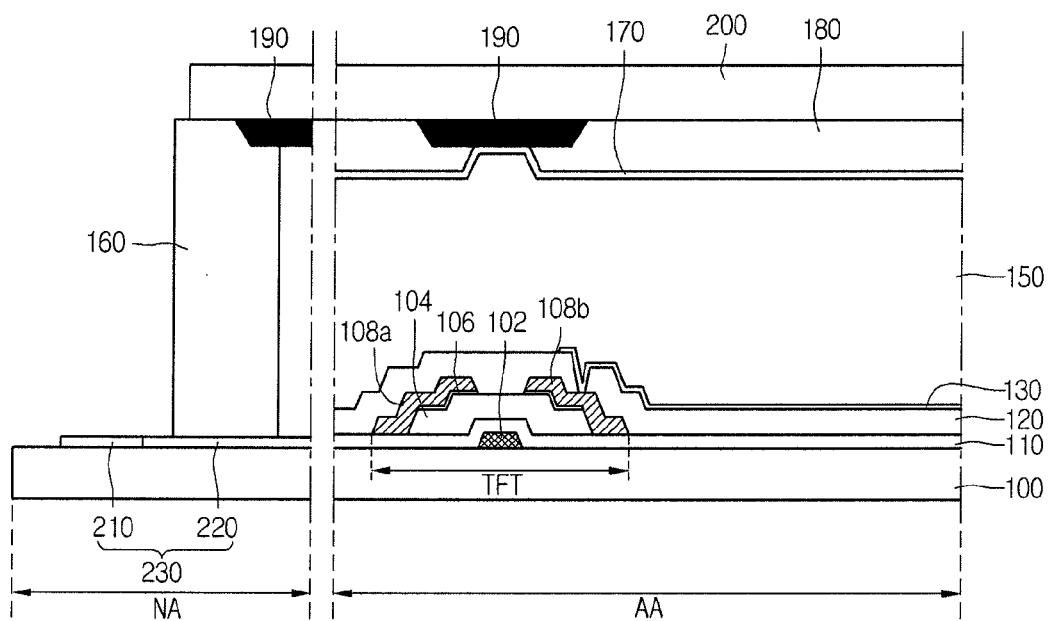
FIG. 1 is a cross-sectional view of an LCD device according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. In the drawings, the size, thickness and so on of a device can be exaggerated for convenience of explanation. Wherever possible, the same reference numbers will be used throughout this disclosure including the drawings to refer to the same or like parts.

FIG. 1 is a cross-sectional view of an LCD device according to an embodiment of the present disclosure.

As shown in FIG. 1, the LCD device according to an embodiment of the present disclosure includes first and second substrates 100 and 200. The first and second substrates 100 and 200 can be defined into an active area AA and a non-display area NA.

The active area AA is used for displaying an image. A thin film transistor TFT and a pixel electrode 130 are formed within the active area AA of the first substrate 100 and used for displaying an image on the first substrate 100.

The non-display area NA is prepared regardless of the image display. Pads 230 are formed in the non-display area NA of the first substrate 100. The pads 230 are connected to an external drive circuit and used to transfer image signals to elements within the active area AA. Such pads 230 can be divided to configure a pad portion 210 and a ground portion 220. The pad portion 210 can include a gate part and a data part. The ground portion 220 performs a grounding function.

The second substrate 200 can include a black matrix 190, color filters 180 and a common electrode which are sequentially formed in the active area AA. The black matrix 190 is formed at a position opposite to the thin film transistor TFT.

Also, the black matrix 190 is formed on edges of the LCD device (i.e., the second substrate 200) in order to prevent light leakage in the other area except the active area AA.

A sealant 160 is formed in the non-display area NA between the first and second substrate. A liquid crystal layer 150 is formed in the active area AA between the first and second substrates 100 and 200.

A gate electrode 102 is formed on the first substrate 100 and from a conductive material such as a metal. A gate insulation film 110 including silicon nitride $SiN_x$ or silicon oxide $SiO_2$ is formed to cover the gate electrode 102.

An active layer 104 is formed on the gate insulation film 110 opposite to the gate electrode 102. The active layer 104 is formed from amorphous silicon. Also, an ohmic contact layer 106 is formed on the active layer 104. The ohmic contact layer 106 can be formed from amorphous silicon doped with an impurity.

Source and drain electrodes 108a and 108b are formed on the ohmic contact layer 106. The source and drain electrodes 108a and 108b are formed from a conductive material such as a metal. Such source and drain electrodes 108a and 108b together with the gate electrode 102 are used to form the thin film transistor TFT.

Although it is not shown in the drawings, the gate electrode 102 is connected to a gate line, and the source electrode 108a is connected to a data line. The gate line and the data line cross each other and define a pixel region.

Also, a protective layer 120 is formed to cover the source and drain electrodes 108a and 108b. The protective layer 120 can be formed from silicon nitride, silicon oxide or an organic insulation material. The protective layer 120 includes a contact hole exposing the drain electrode 108b.

A pixel electrode 130 is formed within the pixel region on the protective layer 120. The pixel electrode 130 can be formed from a transparent conductive material. Such a pixel electrode 130 is connected to the drain electrode 108b through the contact hole.

The second substrate 200 is disposed over the first substrate 100 and spaced from a fixed distance. The second substrate 200 can be formed from a transparent insulation material. The black matrix 190 is formed on the inner surface of the second substrate 200 opposite to the thin film transistor TFT.

The color filters 180 are formed on the second substrate 200 provided with the black matrix 190. The color filters 190 include red, green and blue color filters alternately arranged with one another. Each of the red, green and blue color filters is disposed in one pixel region defined by the black matrix 190.

The common electrode 170 is formed on the color filters 180 and the black matrix 180. The common electrode 170 can be formed from a transparent conductive material.

A liquid crystal layer 150 is formed between the first and second substrates 100 and 200. Also, the sealant 160 is formed between the first and second substrates 100 and 200. The sealant 160 prepares a gap to be used for the injection of a liquid crystal material to prevent leakage of the injected liquid crystal material.

Although it is not shown in the drawings, an absorbent layer able to absorb a wide wavelength range of laser light can be formed on a part of the sealant 160 within the non-display area NA. The absorbent layer can be formed from either a resin-based material that is the same as the black matrix 190, or a pigment that is the same as the color filter 180. So, the absorbent layer is formed from the same material as the black matrices 190 when the black matrices 190 are formed from the resin-based material. And the absorbent layer is formed from the same material as the color filters 180 when the color filters 180 are formed from the pigment.

Such first and second substrates 100 and 200 are combined with each other by the sealant 160 and cut into the size of a desired product model through a cutting process using a scriber. Then, a part of the sealant 160 is exposed to the exterior of the second substrate 200.

More specifically, the absorbent layer overlapping with a part of the sealant 160 is burnt during a burning process using a laser beam, and then a part of the second substrate 200 is removed together with the burnt absorbent layer through a cutting process. In accordance therewith, a part of the sealant 160 can be exposed.

In this way, the method of the present disclosure allows the absorbent layer overlapping with a part of the sealant 160 to be burnt during a burning process using a laser beam, and then the second substrate 200 and the burnt absorbent layer to be cut through a cutting process. Therefore, the effect of the laser beam being directly applied to the sealant 160 can be minimized.

Subsequently, a method of fabricating the above-mentioned LCD device will be described.

Figure 2:
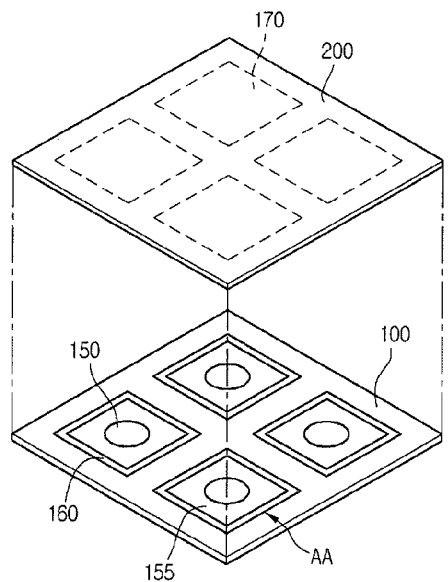
FIG. 2 is a view illustrating a method of fabricating the LCD device of FIG. 1.
Figure 3:
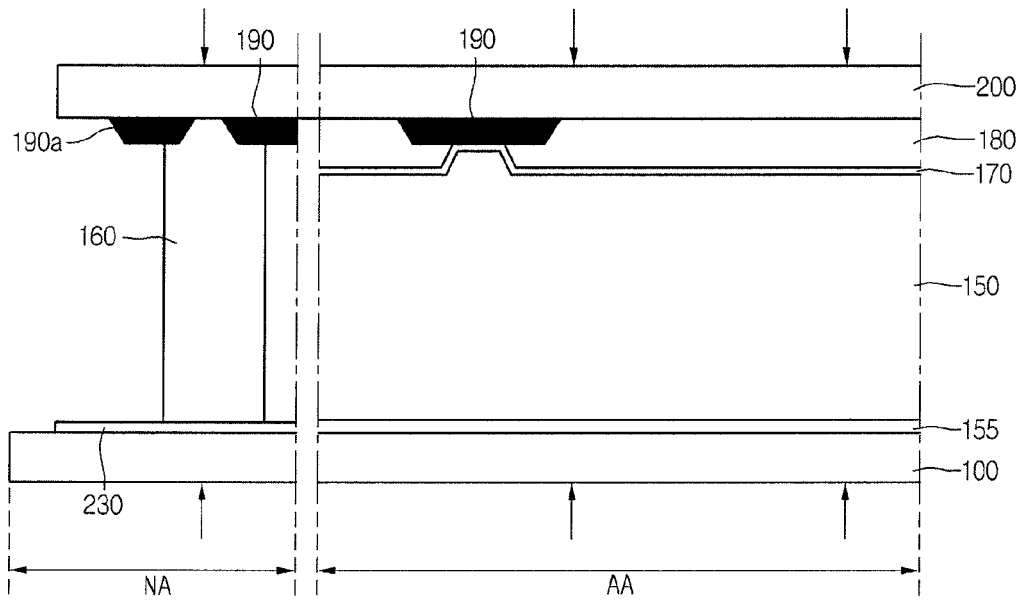
FIG. 3 is a cross-sectional view showing the combined state of the first and second substrates which are shown in FIG. 2.

FIG. 2 is a view illustrating a method of fabricating the LCD device of FIG. 1. FIG. 3 is a cross-sectional view showing the combined state of the first and second substrates which are shown in FIG. 2.

As shown in FIGS. 2 and 3, first and second substrates 100 and 200 are prepared. Each of the first and second substrates 100 and 200 is formed from a glass plate with a fixed thickness. Such first and second substrates 100 and 200 are formed in a size large enough to make four liquid crystal panels.

A display circuit portion 155 is formed in each of four active areas AA of the first substrate 100. The display circuit portion 155 includes thin film transistors, pixel electrodes and so on. The thin film transistor is formed using a multi-crystalline silicon film as an active layer. Also, pads 230 are in non-display areas NA of the first substrate 100.

Thereafter, sealants 160 are formed in frame shapes each surrounding the active areas AA through a coating process. The sealant 160 can be formed from an adhesive material such as a thermosetting material, a photo (UV) curing material or others. For example, the sealant 160 can be formed by coating a transparent acrylic-based or epoxy-based material using a dispenser. The sealant is formed between the first and second substrates 100 and 200 and opposite to the pads 230.

Meanwhile, a black matrix 190, color filters 180 and a common electrode 170 are formed in each of the active areas AA of the second substrate 200. The common electrode 170 is formed from a transparent conductive material.

Afterward, a fixed quantity of liquid crystal material is loaded on each of the areas surrounding the sealants 160. Then, the first and second substrates 100 and 200 are aligned so that the active areas AA of the first substrate 100 face the common electrodes 170 of the second substrate 200.

Subsequently, the first and second substrates 100 and 200 are pressed with a fixed pressure in their facing direction and bound to each other by the sealants 160. The bound first and second substrates 100 and 200 are combined with each other by curing the sealants 160.

To this end, an absorbent layer 190*a* is formed to overlap with outer edges of the sealants 160. The absorbent layer 190*a* is formed from the same material as the black matrix 190 which is formed in each of the active areas AA of the second substrate 200. Such an absorbent layer 190*a* can be formed to overlap with the outer edges of the sealants 160 by being patterned together with the black matrices 190.

When the sealants 160 are cured using heat or UV light for the combination of the first and second substrates 100 and 200, the absorbent layer 190*a* shields the outer edges of the sealants 160 from UV light. As such, the outer edge of each sealant 160 overlapping with the absorbent layer 190*a* is lightly cured compared to the rest of each sealant 160 not overlapping with the absorbent layer 190*a*.

Figure 4A:
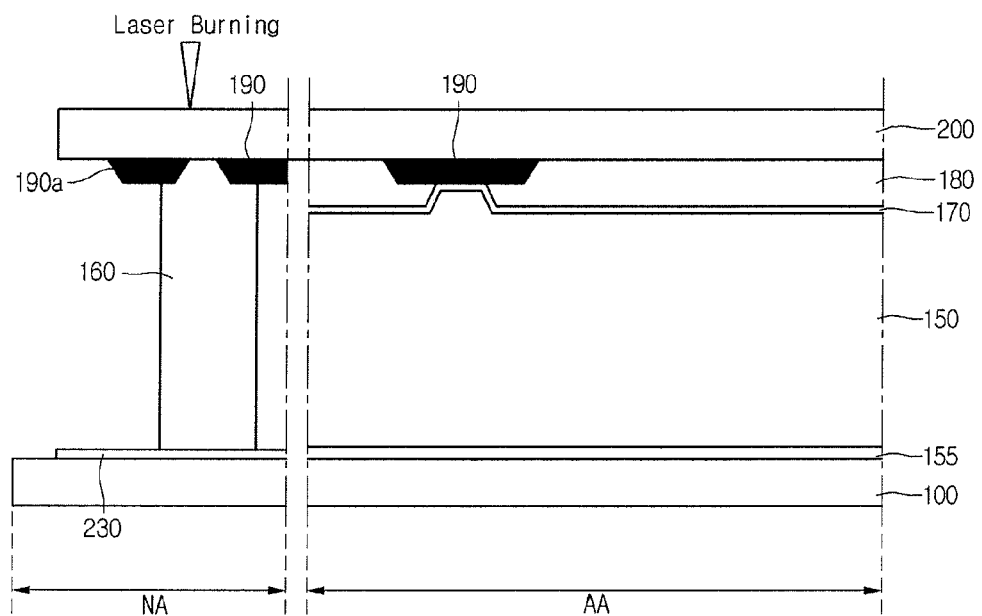
FIGS. 4A through 4C are cross-sectional views illustrating processes which are performed after combining the first and second substrates as shown in FIG. 3.

After the combination of the first and second substrates 100 and 200, a process of burning the absorbent layer 190*a* is performed by irradiating a laser beam on the absorbent layer 190*a* overlapped with the outer edges of the sealants 160, as shown in FIG. 4A. At this time, the laser beam is irradiated to focus on the absorbent layer 190*a* in order to prevent a direct irradiation of the laser beam for the sealants 160. As such, leakage of the sealants 160 can be minimized. The laser used the burning process comprises one of a gas type laser, liquid type laser, solid-state type laser, and plasma x-ray laser. The gas laser comprises He-Ne laser, CO2 laser, and Excimer laser. The liquid type laser comprises Dye laser and the solid-state laser comprises Ruby laser, Nd:YAG laser, Nd:YLF laser, Nd:glass laser, and Ti:sapphire laser.

The absorbent layer 190*a* is formed from a black resin-based material with a wide absorptive range of laser wavelengths. As such, the absorbent layer 190*a* can easily absorb the laser beam even though a low energy laser beam is irradiated. In accordance therewith, the absorbent layer 190*a* can be easily burnt by a low energy laser beam.

Alternatively, the absorbent layer 190*a* can be formed from the same as one of the red, green and blue pigments, which are used to form the color filters 180 on the second substrate 200, instead of the same material as the black matrix 190. The red, green and blue pigments can easily absorb the low energy laser beam because they have a wider absorptive range of laser wavelengths compared to the sealant 160.

Figure 4B:
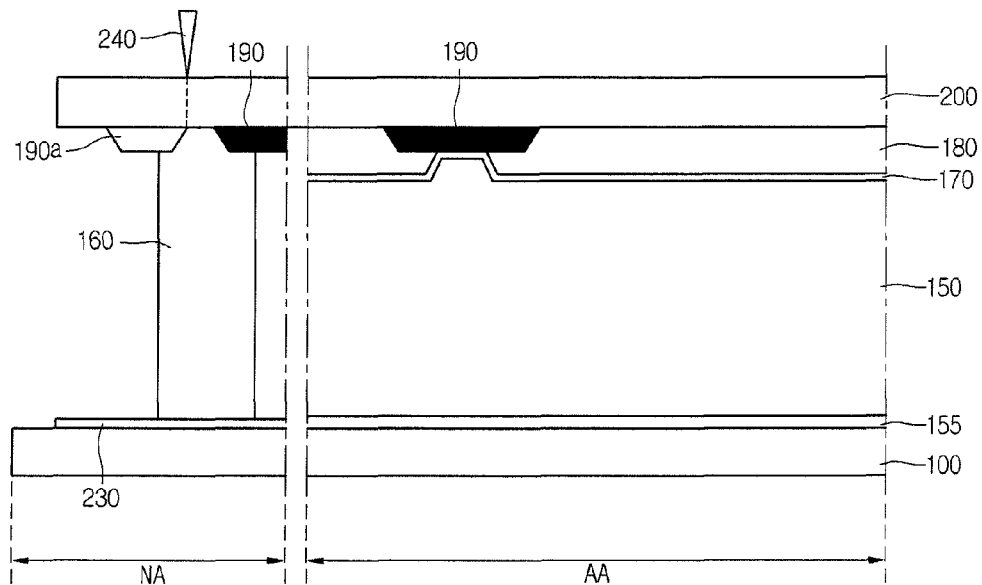
Figure 4C:
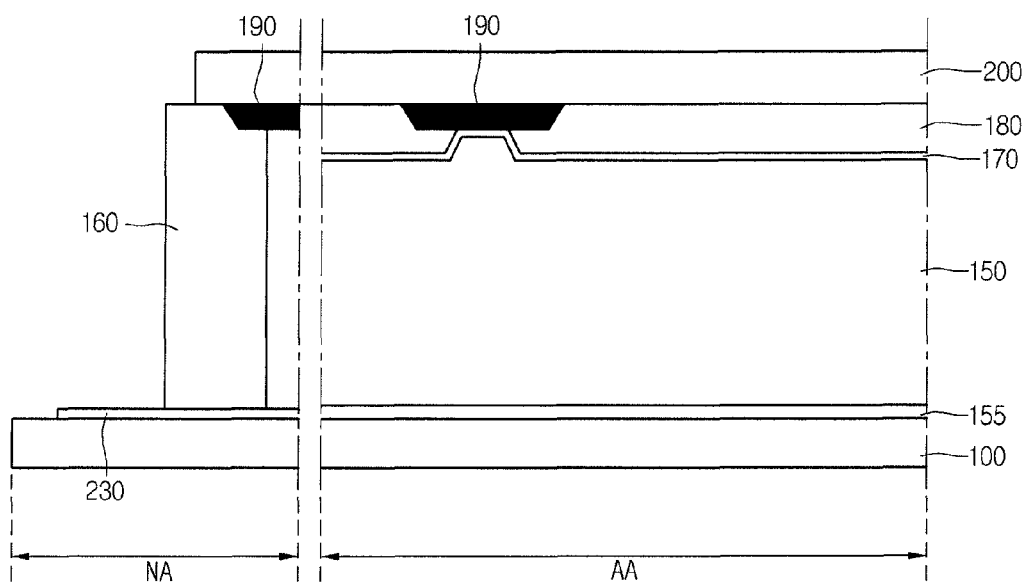

Thereafter, a first cutting process using a scriber 240 is performed for the second substrate 200 with the absorbent layer 190*a* which is burnt by the laser beam, as shown in FIG. 4B. The first cutting process using the scriber 240 allows the burnt absorbent layer 190*a* and a part of the second substrate 200 with the burnt absorbent layer 190*a* to be removed.

Subsequently, the residual of the absorbent layer 190*a* remaining at the outer edge of each sealant 160 is removed through a brushing process. Therefore, the outer edges of the sealants 160 are externally exposed.

As described above, since the absorbent layer 190*a* formed to face the outer edges of the sealants 160 has a wide absorptive range of laser wavelengths compared to the sealant 160, the absorbent layer 190*a* can easily absorb a low energy laser beam and is easy to burn when the low energy laser beam is irradiated.

The LCD device fabrication method of the present embodiment allows the burning process to be performed in a state that the absorbent layer 190*a* easily absorbing the low energy laser beam overlaps with a part of the sealant 160. As such, the LCD device fabrication method can minimize leakage of the sealants 160 unlike that of the related art which must use a high energy laser beam able to burn the sealants 160.

The absorbent layer 190*a* functions as a shielding portion which prevents the effect of the laser beam directly applied to the sealants 160. In other words, the laser beam is not irradiated directly to the sealants 160. Therefore, leakage of the sealants 160 can be minimized.

The minimized leakage of the sealants 160 allows the deterioration of the adhesive strength of the sealant 160 to be minimized. Also, an applying quantity of energy can be minimized, and furthermore a process margin can be secured.

After the brushing process, the first and second substrates 100 and 200 can be simultaneously cut through a second cutting process using a scriber. At this time, the simultaneous cutting of the first and second substrates 100 and 200 can be easily performed because the externally exposed outer edge of the sealant 160 is in a lightly cured state compared to the rest of the sealant 160. This results from the fact that only the externally exposed outer edge of the sealant 160 had been shielded by the absorbent layer 190*a* at the irradiation of UV light.

The ordinary skilled person in the art should understand that various changes or modifications of the present disclosure are possible without departing from the technical spirit or the essential features of the present disclosure. As such, it should be understood by the ordinary skilled person in the art that the above-mentioned embodiments are provided as examples of the present disclosure, but the present disclosure is not limited these embodiments. Accordingly, the scope of the present disclosure shall be determined only by the appended claims and their equivalents. Moreover, it should be considered that alternative uses derived from the meaning, scope and their equivalent concepts defined in the claims are included in the scope of the present disclosure.

What is claimed is:

1. An LCD device fabrication method which includes combining a first substrate having thin film transistors with a second substrate having black matrices and color filters using a sealant, the method comprising:
    forming an absorbent layer which is positioned to overlap with an edge of the sealant;
    curing the sealant partially covered with the absorbent layer by irradiating UV light;
    burning the absorbent layer using a laser beam; and
    cutting a burnt absorbent layer and the second substrate which is positioned on the burnt absorbent layer using a scriber.

2. The method of claim 1, wherein the absorbent layer has a wider absorptive range of laser wavelengths compared to the sealant.

3. The method of claim 1, wherein the absorbent layer is formed from one of a resin-based material and a pigment.

4. The method of claim 3, wherein the absorbent layer is formed from the same material as the black matrices when the black matrices are formed from the resin-based material.

5. The method of claim 3, wherein the absorbent layer is formed from the same material as the color filters when the color filter is formed from the pigment.

6. The method of claim 1, wherein the absorbent layer overlapping with the edge of the sealant is formed by being patterned through a mask process.

7. The method of claim 1, further comprises removing a residue of the burnt absorbent layer on the edge of the sealant through a brushing process.

8. The method of claim 7, further comprises simultaneously cutting the first and second substrates using a scriber after the brushing process.

9. The method of claim 1, wherein a portion of the sealant overlapped with the absorbent layer is lightly cured compared to the rest of the sealant uncovered with the absorbent layer, at the irradiation of UV light.

10. The method of claim 1, wherein the edge of the sealant is exposed to an exterior of the second substrate when the absorbent layer is removed.

11. The method of claim 1, wherein the absorbent layer is at least one compound oxide black pigment selected from a group consisting of compound-oxide black pigments composed of copper and chromium as principal metal components, compound-oxide black pigments composed of copper and manganese as principal metal components, compound-oxide black pigments composed of copper, iron and manganese as principal metal components, compound-oxide black pigments composed of cobalt, chromium and iron as principal metal components, compound-oxide black pigments composed of cobalt, chromium, iron and manganese as principal metal components and compound-oxide black pigments composed of cobalt, nickel, chromium and iron; or a black or dark-colored mixture of at least two pigments selected from the group consisting of brown, green and blue compound-oxide pigments.

12. The method of claim 1, wherein the laser comprises one of a gas type laser, liquid type laser, solid-state type laser, and plasma x-ray laser.

* * * * *